United States Patent [19]

Shinbori et al.

[11] Patent Number: 4,803,555
[45] Date of Patent: Feb. 7, 1989

[54] METHOD OF DRIVING A SOLID STATE IMAGE PICKUP DEVICE

[75] Inventors: Kenichi Shinbori; Kazuo Ishikawa, both of Yokohama, Japan

[73] Assignee: Canon Kabushiki Kaisha, Tokyo, Japan

[21] Appl. No.: 89,045

[22] Filed: Aug. 24, 1987

Related U.S. Application Data

[63] Continuation of Ser. No. 903,828, Sep. 3, 1986, abandoned, which is a continuation of Ser. No. 843,829, Mar. 26, 1986, abandoned, which is a continuation of Ser. No. 596,404, Apr. 3, 1984, abandoned.

[30] Foreign Application Priority Data

Apr. 6, 1983 [JP] Japan ................. 58-61098

[51] Int. Cl.⁴ ............................... H04N 3/14
[52] U.S. Cl. ..................... 358/213.19; 358/213.26
[58] Field of Search ............... 358/209, 212, 213.19, 358/213.23, 213.25, 213.26, 213.27; 357/24 LR

[56] References Cited

U.S. PATENT DOCUMENTS

| | | | |
|---|---|---|---|
| 3,931,463 | 1/1976 | Levine | 358/213 |
| 3,944,816 | 1/1976 | Harada | 358/213 |
| 4,245,164 | 1/1981 | Funahashi | 358/213 |
| 4,302,779 | 11/1981 | Inoue | 358/213 |
| 4,322,753 | 3/1982 | Ishihara | 358/213 |
| 4,430,672 | 2/1984 | Berger | 358/213 |
| 4,472,744 | 9/1984 | Inoue | 358/213 |
| 4,485,405 | 11/1984 | Bailey | 358/213 |
| 4,644,403 | 2/1987 | Sakai et al. | 358/213 |
| 4,663,669 | 5/1987 | Kinoshita et al. | 358/213.19 |

Primary Examiner—Jin F. Ng
Assistant Examiner—Stephen Brinich
Attorney, Agent, or Firm—Fitzpatrick, Cella, Harper & Scinto

[57] ABSTRACT

A method of driving a solid-stage image pickup device of the frame transfer type comprises an image sensing part for generating an electrical signal in response to incident light, a storage part for taking and storing the signal generated in the image sensing part, and means for preventing blooming provided at least near the boundary between these image sensing part and storage part. This driving method comprises the steps of: driving the image sensing part independently of the storage part at an arbitrary time; collecting the generated signal near the boundary; clearing them using the blooming preventing means located therein; thereafter, synchronously driving the image sensing part and the storage part under a predetermined relation, thereby transferring the signal in less than the standard television field interval which has been generated so far in the image sensing part to the storage part and storing it therein.

55 Claims, 5 Drawing Sheets

METHOD OF DRIVING A SOLID STATE IMAGE PICKUP DEVICE

This application is a continuation of application Ser. No. 903,828, filed Sept. 3, 1986, and now abandoned, which is a continuation of Ser. No. 843,829, filed Mar. 26, 1986, and now abandoned, which is a continuation of Ser. No. 596,404, filed Apr. 3, 1984, and now abandoned.

BACKGROUND OF THE INVENTION

1. Field of the Invention

The present invention relates to a method of driving a solid-state image pickup device, in particular, a solid-state image pickup device of the frame transfer type.

2. Description of the Prior Art

As an example, in case of using the solid-state image pickup device of the frame transfer type (e.g., a CCD) for the purpose of image pickup in a television, it is necessary to drive such a device at the same period as the field period of the television. For instance, in the television system compliance with the NTSC system, the field period is 1/60 sec. Therefore, in case of the frame transfer type device, it is necessary to drive this so as to transfer the signal (charges) from the image sensing part to the storage part at a period of 1/60 sec and to read out the stored signal (charges) from the storage part for almost 1/60 sec.

On the other hand, although it is also necessary to set the output of the device or the level of the image pickup signal to be obtained by processing this output to be within a predetermined stable range for the wide luminance variation of an image object to be picked up, this point is solved in the manner such that, for example, a quantity of incident light into the image sensing part is adjusted using a diaphragm or other means, or that an AGC amplifier is interposed in the output processing system, thereby adjusting the signal level. However, in most cases where an image object is extremely bright, in many cases the signal level cannot be sufficiently adjusted even by the above-described diaphragm or AGC amplifier.

In addition, for example, in other cases where the object is moving at a high speed, the driving of the device for the time period in accordance with the field period of the television mentioned above causes the photo-sensing time by the image sensing part to be almost 1/60 sec; therefore, this may cause an undesirable situation such as, so-called, flow or slide of picture image upon display.

In any of the above cases, such inconvenience is caused due to the fact that the device has to be driven for the time period in accordance with the field period of the television. To avoid this inconvenience, a method has been considered whereby a mechanical shutter is used, thereby controlling the photo-sensing time. However, an additional shutter must be provided, so that the image pickup apparatus becomes large and the constitution and control method becomes complicated; moreover, it will cause a new drawback in the increase in price of the apparatus.

On the other hand, for example, according to the specification of U.S. Pat. No. 3,944,816, in a method of driving a solid-state image pickup device in which a storage pulse (i.e., photo gate bias) is added to the image sensing part to form a potential well and the signal (charges) generated due to the photo-excitation is stored (are accumulated) in this well, there is disclosed a driving method whereby the photo-sensing interval corresponding to one field interval of the television is divided into the non-storage interval of the length responsive to the intensity of the incident light and the storage interval. The storage pulse is added for only the storage interval, thereby storing the generated signal into the well thus formed. According to this method, it is possible to avoid such drawback as mentioned before.

However, even in this method, a problem still remains which has to be solved. Namely, the signal (charges) is generated by the image sensing part due to the photo-excitation even during the above-mentioned non-storage interval. This state is the diffused state over the whole image pickup surface of the image sensing part since the storage well is not formed because no storage pulse is added. Therefore, thereafter when the well is formed by adding the storage pulse in the storage interval, the signal which is in the diffused state is stored in a proper well. Consequently, this signal in the diffused state exerts the influence, as the noise, on the normal signal to be obtained in the storage interval after that, so that this causes the picture quality to largely deteriorate. It is also of course possible, for instance, to provide a blooming preventing mechanism in the image sensing part and thereby to clear the signal generated in the non-storage interval by means of this blooming preventing mechanism. However, even in this case, there is no guarantee at all that all the signals generated can be reliably cleared by this blooming preventing mechanism, so that those signals may remain as the noise level.

SUMMARY OF THE INVENTION

The present invention was made in consideration of the above-described occurrences in prior devices and it is a main object of the invention to provide a novel method of driving a solid-state image pickup device of the frame transfer type which can eliminate such drawbacks in the above-mentioned conventional driving method.

It is another object of the present invention to provide a novel method of driving a frame transfer type solid-state image pickup device which can arbitrarily select the signal storage time in the image sensing part of the device and can sufficiently prevent the unnecessary signal from being mixed as noise with a desired signal at that time.

Still another object of the present invention is to provide an image pickup apparatus using such a method as mentioned above.

Other objects and features of the invention will be better understood from the following detailed description and the accompanying drawings.

DESCRIPTION OF THE PREFERRED EMBODIMENTS

A preferred embodiment of the present invention will now be described hereinbelow with reference to the accompanying drawings.

Figure 1:
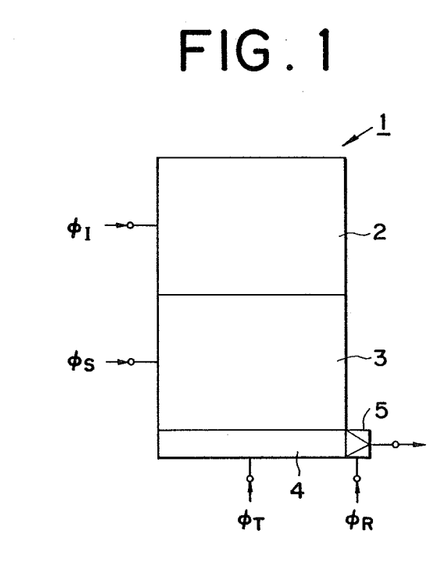
FIG. 1 is a diagram showing an example of a well-known solid-state image pickup device of the frame transfer type.

First, an example of the frame transfer type solid-state image pickup device (image sensor) will be described with reference to FIG. 1. FIG. 1 shows an example of the frame transfer type CCD, in which a reference numeral 1 denotes the frame transfer type CCD; 2 indicates an image sensing part for generating an electrical signal, i.e. charges in response to the incident light, and for storing it; 3 is a storage part for taking the charges generated and accumulated in the image sensing part 2 and temporarily storing them; 4 a horizontal register part for sequentially reading out the charges stored in the storage part 3 one line by one; and 5 an output amplifier part, provided on the output side of the horizontal register part 4, for converting the charges into the voltage.

As is well known, the image sensing part 2 has a two-dimensional arrangement of image pickup cells which are arranged along predetermined numbers of rows and columns. In addition, the storage part 3 has a two-dimensional arrangement of memory cells which are similarly arranged along the rows and columns of the same numbers as those of the image sensing part 2. The horizontal register part 4 has a uni-dimensional arrangement along the rows of the charge transfer cells of the number which is at least equivalent to the number of the columns of the memory cell arrangement in the storage part 3 and is shielded against the light excluding a predetermined region of the image sensing part 2.

As is well known, in case of using such a frame transfer type CCD 1 for the purpose of a television, at least the following pulse trains are needed: mutually synchronized vertical transfer pulse train to be applied to the image sensing part 2 and storage part 3 at a period responsive to the field period of the television in order to vertically transfer the charges generated and accumulated in the image sensing part 2 from the image sensing part 2 to the storage part 3; an almost mutually synchronized step transfer pulse train to be applied to the storage part 3 and horizontal register part 4 at the period responsive to the line period of the television in order to step-transfer the charges stored in the storage part 3 to the horizontal register part 4 one line by one; a horizontal transfer pulse train to be applied to the horizontal register part 4 in order to horizontally transfer the charges in the horizontal register part to the output amplifier part 5 in the interval of one line; and a pulse train to be applied to the output amplifier part 5 in order to reset the charges each time the charge-voltage conversion of each pixel information is performed. In addition, as already mentioned as a conventional example, in case of the device whereby a charge accumulating potential well is formed in each cell in the image sensing part 2 by a photo gate bias applied thereto, there is needed the photo gate bias (storage pulse) to be applied to the image sensing part 2 in each field interval. On the other hand, as for such a driving method of a CCD, various methods are available such as the single-phase driving, two-phase driving, three-phase driving, etc. However, it will be appreciated that the number of kinds of respective pulse trains increases with an increase in number of phases.

An example of the well-known single-phase drive frame transfer type CCD will be subsequently described hereinafter for the purpose of simplicity of description.

Figure 2A:
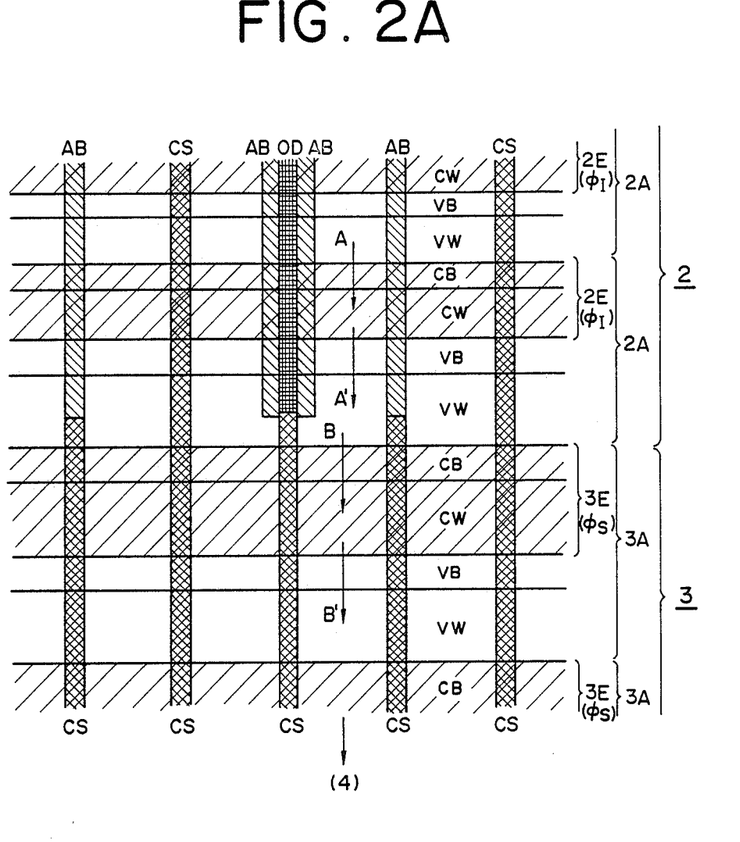
FIGS. 2A and 2B are diagrams illustrating the details of the principal parts of a well-known CCD of the single-phase drive frame transfer type.

Referring now to FIG. 2A, which illustrates in detail the constitution near the boundary portion of the image sensing part 2 and storage part 3 of the single-phase drive frame transfer type CCD, CB, CW, VB, and VW represent the regions having mutually different potentials which constitute each image pickup cell 2A of the image sensing part 2 and each memory cell 3A of the storage part 3 having one set of those regions. When it is assumed that the potentials in each region for the electrons are expressed by P(CB), P(CW), P(VB), and P(VW), those regions are formed so as to satisfy the relations of P(CB)>P(CW) between the regions CB and CW and of P(VB)>P(VW) between the regions VB and VW. For the regions CB and CW in the image sensing part 2, a common electrode (clear electrode) 2E is formed thereon, while for the regions CB and CW in the storage part 3, a common electrode 3E is formed thereon, respectively. When a relatively low-level voltage (e.g., −15 volts) is applied to these electrodes 2E and 3E, the potential relationship among the above four regions becomes P(CB)>P(CW)>P(VB)>P(VW). On the other hand, when a relatively high-level voltage (e.g., 0 volt) is applied, its relation becomes P(VB)>P(VW)>P(CB)>P(CW). A reference character CS represents a channel stopper; AB denotes an anti-blooming barrier having a lower barrier than that of the channel stopper; and OD is an overflow drain as clear means. The respective cells 3A of the storage part 3 are separated as a sector by the channel stopper CS in the horizontal direction, respectively. On the other hand, the respective cells 2A of the image sensing part 2 are separated as a sector in the horizontal direction by respectively arranging the channel stopper CS, anti-blooming barrier AB and overflow drain OD having the anti-blooming barriers ABs on both sides for every three cells. In addition, as shown in FIG. 2A, the anti-blooming barrier AB and overflow drain OD in the image sensing part 2 are connected to the channel stopper of the storage part 3 in the portion of the region VW of the cell 2A which locates in the final one row closest to the storage part 3 in the image sensing part 2. In this embodiment, although an example of the overflow drain as the clear means has been mentioned, the invention is not limited to this and it may possible to apply an alternating pulse having a large peak-to-peak value to the transfer electrode 2E for allowing the charge in the image sensing part to be recombined at the surface, thereby to extinguish the charges over a predetermined level.

Figure 2B:
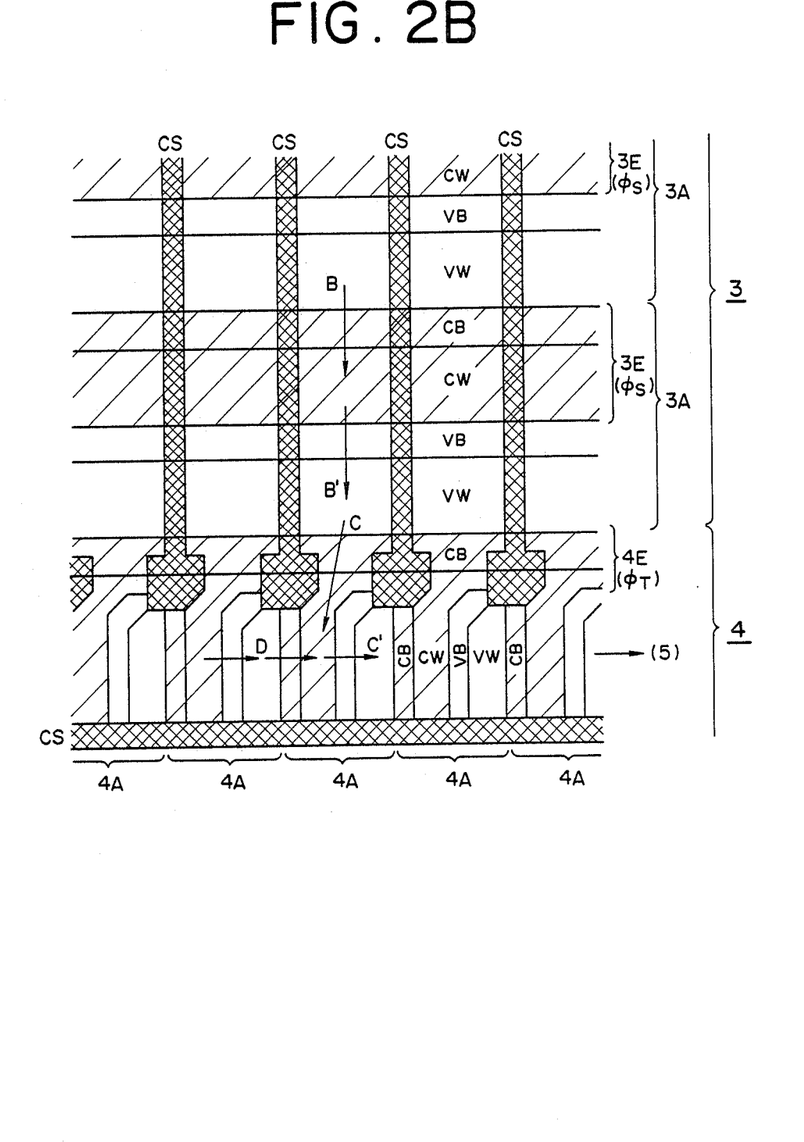

Referring next to FIG. 2B, which illustrates the details of the constitution near the boundary between the storage part 3 and the horizontal register part 4 of the above-mentioned single-phase drive frame transfer type CCD, the same components and elements as those in FIG. 2A are designated by the same reference numerals. As shown in the drawing, even in the horizontal register part 4, each transfer cell 4A thereof is constituted by a set of the respective regions of CB, CW, VB and VW which are sequentially arranged along the transfer direction of the charges, and each cell 4A is made to correspond to the different column of the storage part 3, respectively. Furthermore in detail, the region of CB is interposed between the horizontal register part 4 and the storage part 3, and each transfer cell 4A is arranged to face the region VW of each memory cell 3A through this interposed region of CB in the portion of the region of CW. On one hand, a reference numeral 4E denotes a common electrode provided for the regions CB and CW of each transfer cell 4A and for the above-mentioned interposed region CB.

In the single-phase drive frame transfer type CCD with such a constitution, when the voltages to be applied to the respective electrodes 2E, 3E and 4E are respectively alternately changed between the high and low levels, the charges move in the directions as indicated by arrows A and A' in FIG. 2A in the image sensing part 2; in the directions as indicated by arrows B and B' in FIGS. 2A and 2B in the storage part 3; in the directions as indicated by arrows C and C' in FIG. 2B between the storage part 3 and the horizontal register part 4; and in the directions as indicated by arrows D and C' in FIG. 2B in the horizontal register part 4. Due to this, there are obtained such respective transfer actions of the charges as the vertical transfer from the image sensing part 2 to the storage part 3, the step transfer from the storage part 3 to the horizontal register part 4 and the horizontal transfer in the horizontal register part 4. In addition, it is needless to say that the voltage to be applied to the electrode 2E of the image sensing part 2 is maintained at the low or high level during the photo-receiving interval, i.e., during the accumulating interval of the light information and that the charges generated due to the photo-excitation are accumulated in the region VW (in case of the low level) or region CW (in case of the high level) of each cell 2A. In the case where, for instance, the overflow of charges occurs at this time due to the excessive quantity of light, the overflowed charges exceeding the anti-blooming barrier AB flow into the overflow drain OD and are cleared. Or, the voltage to be applied to the electrode 2E is maintained at an intermediate level (e.g., $-7$ volts) in the photo-receiving interval to obtain the potential relationship of P(CB)=P(VB)>P(CW)=P(VW), thereby allowing the charges generated due to the photo-excitation to be accumulated in each of the regions CW and VW (namely, this is nothing but that the image pickup cell consisting of the regions CB and CW and the image pickup cell consisting of the regions VB and VW are equivalently formed). By switching the above voltage from the intermediate level to the low level ($-15$V) or to the high level (0V) when the charges are vertically transferred from the image sensing part 2 to the storage part 3, the stored charges in the region CW and the stored charges in the region VW are appropriately added to produce the signal of one line. And the interlacing function may be obtained by changing the combination of this addition depending upon the odd-number field and even-number field (i.e., this is changed depending upon whether the above-mentioned voltage is switched from the intermediate level to the low level or to the high level).

Figure 3:
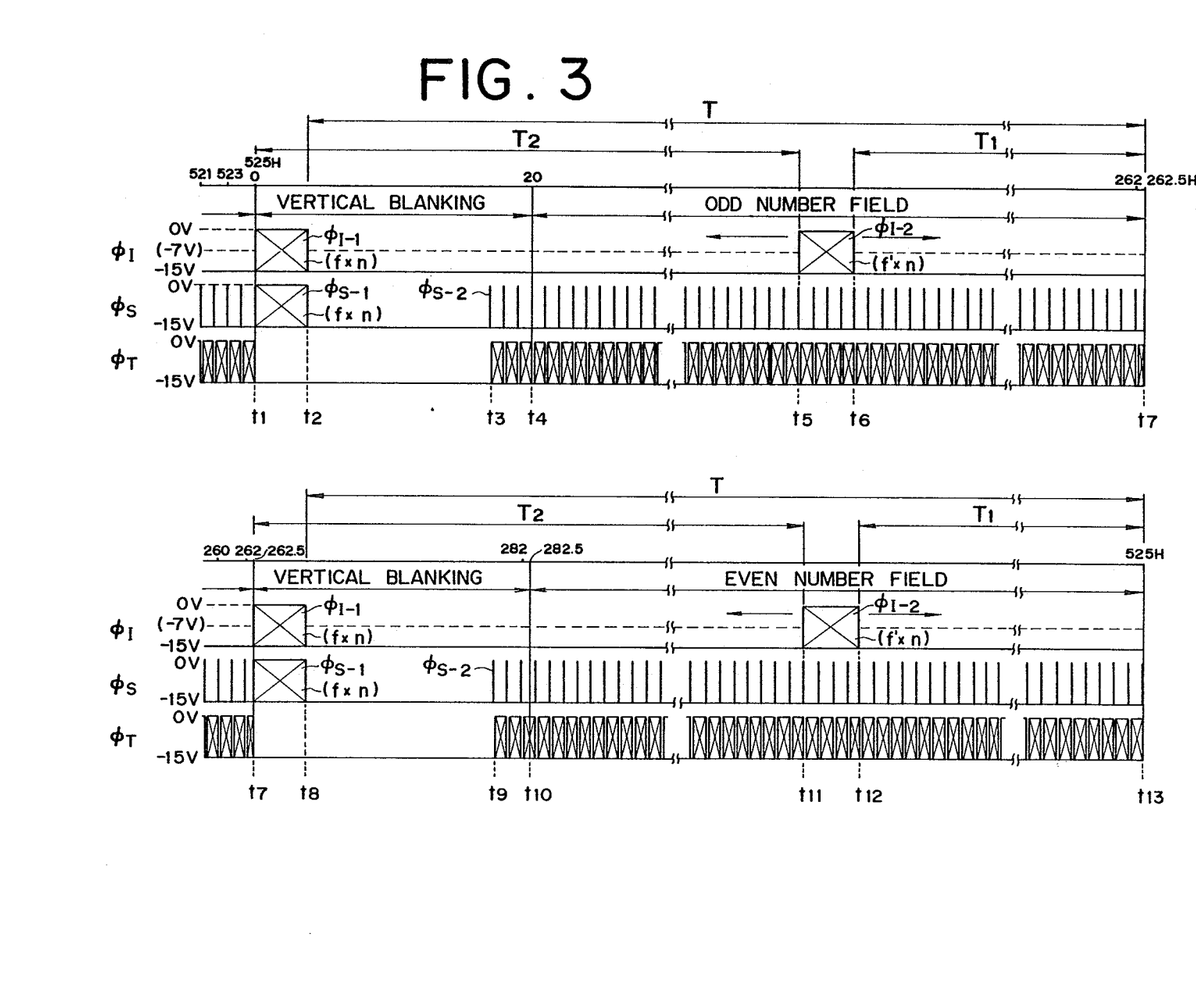
FIG. 3 shows a timing chart to describe one embodiment of the present invention.

One embodiment of the present invention in the case where the single-phase drive frame transfer type CCD described above is used will now be described with reference to FIG. 3. FIG. 3 shows control signals $\phi_I$ for the image sensing part to be applied to the image sensing part 2 (electrode 2E) of the CCD 1 according to the present invention, control signals $\phi_S$ for the storage part to be applied to the storage part 3 (electrode 3E) and a horizontal transfer pulse train $\phi_T$ for the horizontal register part to be applied to the horizontal register part 4 (electrode 4E). A well-known reset pulse train $\phi_R$ for the output amplifier part 5 is omitted in FIG. 3.

First, to read out the odd-number fields, at the beginning (time $t_1$) of the vertical blanking interval which precedes from the odd-number field interval, mutually synchronized vertical transfer pulse trains $\phi_{I-1}$ and $\phi_{S-1}$ serving as the above-mentioned control signals $\phi_I$ and $\phi_S$ are applied to the image sensing part 2 and storage part 3, respectively. (The first step) Now assuming that the numbers of respective cells 2A and 3A which are arranged vertically in the image sensing part 2 and storage part 3, i.e., the numbers of rows are together n, both of those pulse trains $\phi_{I-1}$ and $\phi_{S-1}$ include n pulses. Assuming that the pulse frequency at this time is f, the charges are vertically transferred from the image sensing part to the storage part 3 (at time $t_2$) in the interval of $1/f \times n$, i.e., of a few H (e.g., 2 to 4 H, where, H denotes one horizontal interval) by applying such vertical transfer pulse trains $\phi_{I-1}$ and $\phi_{S-1}$. Thereafter, the accumulation of new charges is started in the image sensing part 2. For that purpose, the control signals $\phi_I$ are maintained at the low level ($-15$V) or intermediate level ($-7$V), for example.

Thereafter (after time $t_3$), a step transfer pulse train $\phi_{S-2}$ is applied as the control signal $\phi_S$ to the storage part 3 (the second step), and at the same time the horizontal transfer pulse train $\phi_T$ is applied to the horizontal register part 4 in response to this. Due to this, the stored charges in the storage part 3 are sequentially read out through the horizontal register part 4 one row by one, i.e., one line by one. (the third step). This image data will actually appear on a display after time $t_4$.

When the readout of the odd-number fields is finished at time $t_7$ in this way, the vertical transfer pulse trains $\phi_{I-1}$ and $\phi_{S-2}$ are again applied respectively to the image sensing part 2 and storage part 3 in the interval of $t_7$-$t_8$ within the subsequent vertical blanking interval (time $t_7$ to $t_{10}$) for allowing the charges to be vertically transferred as the first step. After that, the accumulation of the charges is again started in the image sensing part 2. On the other hand, the step transfer pulse train $\phi_{S-2}$ and horizontal transfer pulse train $\phi_T$ are respectively applied again to the storage part 3 and horizontal register part 4 after time $t_9$ as the second step, so that the readout of the even-number fields is performed until time $t_{13}$. It is now assumed that the field period as the time period in the first step is the first period and that the horizontal period as the time period in the second step is the second period.

In this way, the readout operation of the odd-number fields and even-number fields are alternately repeated. As will be understood from the above description, the charge accumulation time in the image sensing part 2 is ordinarily fixed to time T corresponding almost to one vertical interval (one field interval, e.g., 1/60 sec in the NTSC system).

On the contrary, in this embodiment, for example, a charge clear pulse train $\phi_{I-2}$ which equivalently corresponds to the vertical transfer pulse train $\phi_{I-1}$ is applied to the image sensing part 2 as the third step if necessary at a proper time, e.g., for intervals of $t_5$-$t_6$ and $t_{11}$-$t_{12}$ while the stored charges are being read out from the storage part 3. That is, this permits the charges in the image sensing parts 2 to be vertically transferred to the storage part 3. However, at this time, the storage part 3 is in the step transfer mode of the charges and is not in the state to take the charges to be sent from the image sensing part 2 in response to its vertical transfer. Therefore, this consequently causes the overflow of charges in the image sensing part 2 and these extra charges flow into the overflow drain OD (in FIG. 2A) and are cleared. As described above, by applying this charge clear pulse train $\phi_{I-2}$, the charges which have been accumulated so far are cleared in the image sensing part 2. As the charge clear pulse train $\phi_{I-2}$, the pulses of the number which is at least not smaller than the above-mentioned line number n are applied. Its frequency f' may be set to an arbitrary frequency and high frequency presents an effect such that the charges can be cleared in extremely short time. However, as is well known, an excessive high frequency adversely makes the transfer efficiency of charges worse, so that the clearing efficiency will deteriorate. On the other hand, a low frequency requires much more time for clearing, so that the opportunity of inflow of the charges into the storage part 3 increases and the device will be more easily influenced. Therefore, the frequency f' should be suitably selected in consideration of these points. In addition, the vertical transfer period in this third step is set to be shorter than the vertical transfer period in the second step. It may be of course possible to set this such that f'=f.

The above-described clearing operation is performed in such a manner that, in brief, the accumulated charges of the image sensing part 2 are forcibly extruded toward the final line, i.e., toward the boundary portion between the image sensing part 2 and the storage part 3 and then the overflowed charges at this time are absorbed by the overflow drain OD at any time. Therefore, strictly speaking, the charges are not cleared but remain with respect to the final line of the image sensing part 2. In addition, since it takes the time of a few H for this clearing, there may be a case where a small quantity of charges are taken in the storage part 3 when the charges in the storage part 3 are step-transferred. However, in any of the above cases, the quantity of these remaining charges is very small and they will actually hardly exert any influence. On the other hand, to prevent the inflow of the charges from the image sensing part 2 to the storage part 3 at the time of this clearing operation, the clear pulse train $\phi_{I-2}$ may be cut off in the interval when each pulse of the step transfer pulse train $\phi_{S-2}$ for the storage part 3 becomes a high level. Or on the contrary, it may be possible to cut off the step transfer pulse for the storage part 3 to cut off the step transfer in this clear interval. In this case, although the signal lacks in the interval of a few H during the clearing operation, this will be able to be appropriately compensated by means of a processor at the post stage.

As a charge accumulating time in the image sensing part 2, due to the clearing of the charges at a proper timing during the readout interval of charges as mentioned above, it is possible to obtain such a time as indicated by, for example, $T_1$ in FIG. 3 which is far shorter than a conventional time T which substantially corresponds to one vertical interval. Furthermore, accumulating time in this case can be properly changed by varying the timing when the pulse train $\phi_{I-2}$ is applied by controlling, e.g., the time $T_2$ from the beginning (time $t_1$ or $t_7$) of the vertical blanking interval to the starting (time $t_5$ or $t_{11}$) of the applying of the clear pulse train $\phi_{I-2}$ for the clear pulse train $\phi_{I-2}$ as indicated by arrows in FIG. 3.

A practical example of the circuit system to obtain the control signals and pulse trains described above will now be described with reference to FIG. 4.

Figure 4:
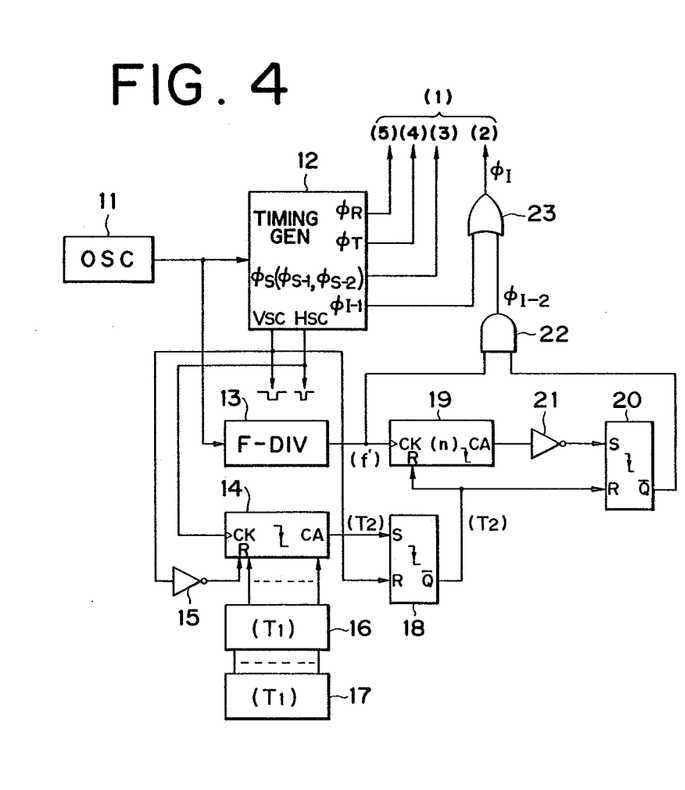
FIG. 4 is a block diagram showing an example of a CCD drive circuit to be used in one embodiment of the present invention.

In FIG. 4, a reference numeral 11 denotes an oscillator for generating a reference clock pulse of a predetermined frequency, and 12 represents a timing signal generator as signal producing means for producing the vertical transfer pulse train $\phi_{I-1}$ for the image sensing part 2 as described with respect to FIG. 3, control signals $\phi_S$ including the vertical transfer pulse train $\phi_{S-1}$ and step transfer pulse train $\phi_{S-2}$ for the storage part 3, horizontal transfer pulse train $\phi_T$ for the horizontal register part 4, reset pulse train $\phi_R$ for the output amplifier part 5, and vertical sync signal $V_{sc}$ and horizontal sync signal $H_{sc}$ for the television in response to a reference clock pulse from the oscillator 11. As is well known, this generator 12 is constituted by a frequency divider, counter, ROM, flip flop, logic gate, etc. The detailed description of such a timing signal generator is omitted here since it is well-known. A numeral 13 is a frequency divider for frequency-dividing the clock pulse from the oscillator 11 to obtain a clock pulse of the frequency of f' serving as the fundamental pulse for the charge clear pulse train $\phi_{I-2}$ for the image sensing part 2, and 14 is a presettable counter for counting the trailing edge of the horizontal sync signal $H_{sc}$ from the timing signal generator 12 and being reset in response to a high output of an inverter 15 for inverting the vertical sync signal $V_{sc}$ from the generator 12. A numeral 16 denotes a presetting circuit for the counter 14 and 17 is switch means such as, e.g., a digital code switch or the like for selecting the accumulating time. For example, the data corresponding to the charge accumulating time $T_1$ described with respect to FIG. 3 is preset for the counter 14 through the presetting circuit 16 due to the operation of this switch 17. The counter 14 has the maximum count capacity of the number (e.g., 256) which substantially corresponds to the number (e.g., about 250) of horizontal sync signals included in for example one vertical interval (one field interval—interval T in FIG. 3). Therefore, a carrier output of the counter 14 substantially defines the interval $T_2$ mentioned with regard to FIG. 3 by presetting the data responsive to the accumulating time $T_1$ through the presetting circuit 16. A numeral 18 is a flip flop which is reset in response to the trailing edge of the vertical sync signal $V_{sc}$ from the timing signal generator 12 and which is set responsive to the trailing edge of the carrier output of the counter 14, and 19 is a counter for counting the trailing edges of the output pulses of the frequency divider 13. This counter 19 is reset by a $\overline{Q}$ output at high level of the flip flop 18 and generates the carrier output whenever it counts (n+1). A numeral 20 is a flip flop which is reset in response to the trailing edge of the $\overline{Q}$ output of the flip flop 18 and which is set responsive to the trailing edge of an output of an inverter 21 for inverting the carrier output of the counter 19, and 22 is an AND circuit which receives the output pulse of the frequency divider 13 and the $\overline{Q}$ output of the flip flop 20. The output of this AND circuit becomes the charge clear pulse train $\phi_{I-2}$ for the image sensing part. A numeral 23 denotes an OR circuit which receives the vertical transfer pulse train $\phi_{I-1}$ for the image sensing part from the timing signal generator 12 and the charge clear pulse train $\phi_{I-2}$ for the image sensing part from the AND circuit 22. The output of this OR circuit becomes the control signal $\phi_I$ for the image sensing part 2. The circuits 13, 19, 20, 21, 22, 23 etc. constitute overflow control means.

In such a circuit arrangement, when a power supply from a power circuit (not shown) is started, each circuit starts its operation, so that the timing signal generator 12 starts the generation of various kinds of control signals and pulse trains $\phi_{I-1}$, $\phi_S$ ($\phi_{S-1}$, $\phi_{S-2}$), $\phi_T$, $\phi_R$, $V_{sc}$, and $H_{sc}$. At this time, the flip flop 18 is reset in response to the trailing edge of the vertical sync signal $V_{sc}$ and its $\overline{Q}$ output becomes high, so that the counter 19 is set into the reset state (uncountable state). Also, the counter 14 is reset in response to the high output of the inverter 15 for inverting the vertical sync signal $V_{sc}$, thereby allowing the counter 14 to count the horizontal sync signal $H_{sc}$ from that time. During this interval, in the CCD1, the charges are vertically transferred from the image sensing part 2 to the storage part 3 and thereafter the charges are read out from the storage part 3. When the counter 14 completes the counting of the value of which the present data corresponding to the charge accumulating time $T_1$ from the presetting circuit 16 was subtracted from the maximum count capacity of the counter 14, it generates the carrier output. The flip flop 18 is set in response to the trailing edge of this carrier output and its $\overline{Q}$ output becomes low. This permits the reset state of the counter 19 to be canceled, so that it starts counting the trailing edges of the pulses from the frequency divider 13. On the other hand, at this time, the flip flop 20 is reset in response to the trailing edge of the $\overline{Q}$ output of the flip flop 18 and its $\overline{Q}$ output becomes high. Due to this, the AND circuit 22 allows the pulse train of the frequency of f' from the frequency divider 13 to be output and this pulse train is output as the charge clear pulse train $\phi_{I-2}$ through the OR circuit 23. Due to this, in the CCD 1, the charges which have been accumulated through the image sensing part 2 so far, i.e., in the interval of $T_2$ in FIG. 3 are cleared due to the above-described action. When the counter 19 finishes the counting of n, it generates the carrier output at the next count value of (n+1). The flip flop 20 is set in response to the trailing edge of the output of the inverter 21 for inverting this carrier output at this time and its $\overline{Q}$ output becomes low, so that this causes the generation of the pulse train, i.e., clear pulse train $\phi_{I-2}$ from the AND circuit 22 to be cut off. Thereafter, when almost all of the charge accumulating time $T_1$ has passed, in the CCD 1, the charges are vertically transferred from the image sensing part 2 to the storage part 3 as described above, then the charges are read out through the horizontal register part 4. The similar operations are subsequently repeated.

In this way, as the charge accumulating time in the image sensing part 2 of the CCD 1, the time $T_1$ shorter than one vertical synchronizing interval T is obtained. In this embodiment, this time $T_1$ can be arbitrarily changed by varying a preset value for the counter 14 by operating the digital code switch 17.

On one hand, after the control signals $\phi_S$ ($\phi_{S-1}$, $\phi_{S-2}$) and pulse trains $\phi_T$ and $\phi_R$ from the timing signal generator 12, and the control signals $\phi_I$ ($\phi_{I-1}$, $\phi_{I-2}$) from the OR circuit 23 are level-adjusted by means of a voltage adjusting circuit or the like if necessary, they are applied to the CCD 1.

Figure 5A:
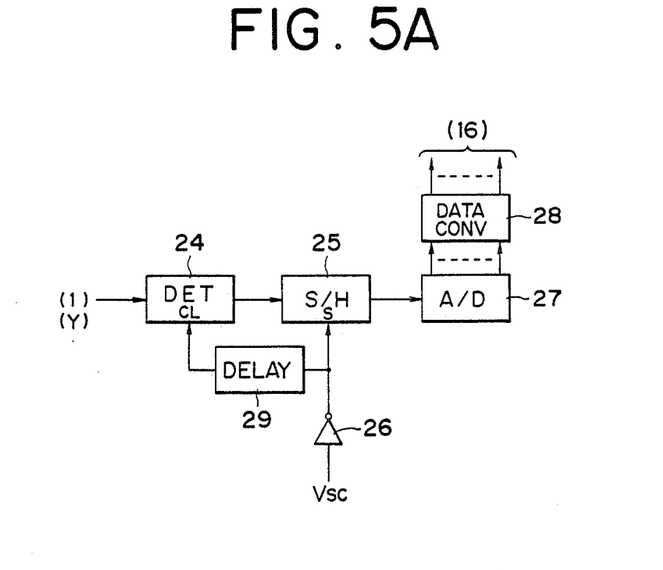
FIGS. 5A and 5B are block diagrams showing the constitutions of the principal parts different from the constitution shown in FIG. 4 of two modifications of the CCD drive circuit.
Figure 5B:
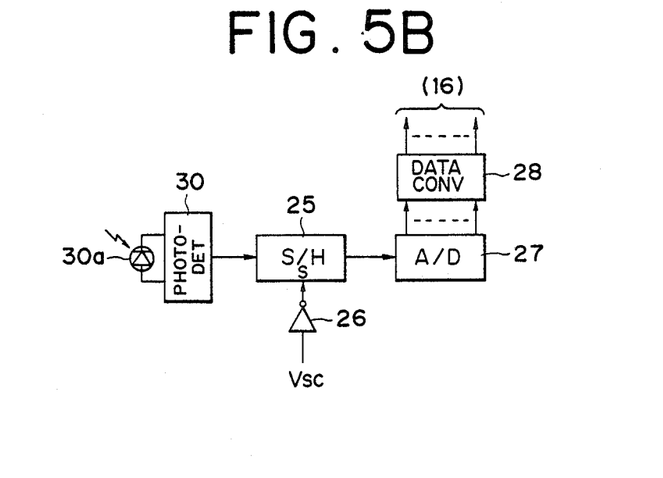

Although the charge accumulating time $T_1$ can be selected by the operation of the digital code switch 17 in the example of FIG. 4, this may be automatically adjusted, for example, on the basis of the information or the like regarding to the brightness of an image object to be picked up. FIG. 5 shows two embodiments in such a case.

First of all, FIG. 5A shows an example in case of automatically controlling in accordance with the output of the CCD 1. In the drawing, a reference numeral 24 denotes a peak detecting circuit for detecting the output of the CCD 1 or the peak level of the luminance signal to be obtained by processing this output, and 25 represents a sample and hold circuit for holding an output of the peak detecting circuit 24 in response to a high output of an inverter 26 for inverting the vertical sync signal $V_{sc}$, wherein the circuits 24 and 25 and the like constitute detecting means. A numeral 27 is an A/D converter for A/D converting an output of the sample and hold circuit 25, and 28 is a data converter for converting an output data of the A/D converter 27 into an accumulating time data. An output of the data converter 28 is applied to the presetting circuit 16 in FIG. 4. Now assuming that the A/D converter 27 outputs a larger data as the luminance level of the output of the CCD 1 becomes higher, the data converter 28 is constituted in the manner such that it outputs data which is inversely proportional to this, i.e., it outputs smaller data. Namely, it may be appreciated that the output data of the A/D converter 27 corresponds to the interval $T_2$ mentioned with respect to FIG. 3. A numeral 29 indicates a delay circuit provided for clearing the peak detecting circuit 24 for the purpose of the detection of a new peak value after the sample and hold circuit 25 completed the holding of the output of the peak detecting circuit 24.

On the other hand, FIG. 5B shows as example in the case where the light which is equivalent to the light to be received by the image sensing part 2 of the CCD 1 is measured, thereby automatically controlling on the basis of its photometric value. In this embodiment, the peak detecting circuit 24 (and the delay circuit 29) in FIG. 5A is replaced by a photometric circuit 30 serving as a detecting circuit having a photometric device 30a adapted to receive the light equivalent to the light which the image sensing part 2 of the CCD 1 receives, and the photometric output is used as an input to the sample and hold circuit 25.

According to two examples shown in FIGS. 5A and 5B, it is possible to automatically control the charge accumulating time $T_1$ in the image sensing part 2 of the CCD 1 on the basis of the information regarding to the brightness of the image object to be picked up.

As described in detail above, according to the present invention, even in case of using the solid-state image pickup device for image pickup by television, its signal storing time can be arbitrarily shortened for the field interval. Therefore, a good image pickup signal can be obtained even under highly bright conditions or even in case of picking up the image of the object which is moving at high speed. In particular, there is an effect such that a good picture quality with less noise can be obtained.

We claim:

1. A method of driving a solid-state image pickup device of the frame transfer type having an image sensing part, a storage part, and a readout part, said method comprising:

(a) a first step of periodically transferring an image charge signal in the image sensing part to the storage part during a first time interval;

(b) a second step of periodically reading out the image charge signal from the storage part one line by one through the readout part each during a second time interval shorter than said first time interval; and (c) a third step of transferring the image charge signal in the image sensing part one line by one to the storage part during a third time interval shorter than said second time interval within said first time interval, wherein said first time interval corresponds to the field time interval of a standard television signal.

2. A driving method according to claim 1, wherein said second time interval corresponds to a horizontal time interval of a standard television signal.

3. A driving method according to claim 1, wherein said third step is performed at a different timing from said first step in accordance with the brightness of an object to be sensed by the image sensing part.

4. A method of driving a solid-state image pickup device of the frame transfer type having an image sensing part, a storage part, an a readout part, said method comprising:
(a) a first step of periodically transferring an image charge signal in the image sensing part to the storage part during a first time interval;
(b) a second step of periodically reading out the image charge signal from the storage part one line by one through the readout part during a second time interval shorter than the first time interval; and
(c) a third step of transferring the image charge signal in the image sensing part to the storage part at a different timing in accordance with the brightness of an object to be sensed by the image sensing part wherein first time interval corresponds to the field time interval of a standard television signal.

5. A driving method according to claim 4, wherein said second time interval corresponds to a horizontal time interval of a standard television signal.

6. A driving method according to claim 4, wherein the brightness of the object is detected using a part of the signal to be obtained in said second step.

7. A driving method according to claim 4, wherein the timing of said third step is controlled in accordance with an output of a photometric device for detecting the brightness of the object.

8. A driving method according to claim 6 or 7, wherein said third step is performed at a later timing during said first period as said object is brighter.

9. An image pickup apparatus comprising:
(a) an image sensing part for converting an object image to be sensed into an electrical signal;
(b) a storage part for storing the signal in said image sensing part;
(c) a readout part for reading out the signal in said storage part one line by one;
(d) signal producing means for producing signals for controlling the manner in which the signal in said image sensing part is periodically transferred to said storage part during a first time interval and in which the signal thus transferred is transferred one line by one to said readout part during a second time interval shorter than said first time interval and thereby to read out the signal through the readout part;
(e) detecting means for detecting the brightness of said object; and
(f) overflow control means for allowing the signal in said image sensing part to be transferred to said storage part during said first time interval at the timing in response to an output of said detecting means.

10. An image pickup apparatus according to claim 9, wherein said first time interval substantially corresponds to a field interval of a standard television signal.

11. An image pickup apparatus according to claim 9, wherein said second time interval substantially corresponds to a horizontal interval of a standard television signal.

12. An image pickup apparatus according to claim 9, wherein said detecting means detects the brightness of the object from an output signal of said readout part.

13. An image pickup apparatus according to claim 9, further including clearing means for clearing the signal of at least a predetermined quantity in said image sensing part.

14. An image pickup apparatus according to claim 13, wherein said clearing means includes an overflow drain provided in said image sensing part.

15. A device comprising:
(A) sensing means having sensing elements arranged in a matrix for receiving radiation, said sensing means including an anti-blooming part to prevent said sensing means from blooming and converting radiation into an electrical signal;
(B) storage means for storing a signal, said means being disposed adjacent said sensing means;
(C) transfer means for transferring said electrical signal in the direction of said storage part, said transfer means transferring said electrical signal in two modes which include: (1) a first mode in which said electrical signal is transferred in the direction of said storage means within said sensing means; and (2) a second mode in which said electrical signal is transferred from said sensing means into said storage means in the direction of said storage means in accordance with a time interval of a standard television signal.

16. A device according to claim 15 further comprising:
change over means for changing over between said first mode and said second mode.

17. A device according to claim 15 further comprising:
read out means for reading out the signal stored in said storage means.

18. A device according to claim 15, wherein anti-blooming part is overflow drain.

19. A device according to claim 16, wherein anti-blooming part is overflow drain.

20. A device according to claim 17, wherein said anti-blooming part is overflow drain.

21. A device comprising:
(A) sensing means having a matrix of sensing elements, said sensing means converting radiation into an electrical signal;
(B) storage means for storing a signal, said storage means being disposed adjacent said sensing means; and
(C) transfer means for transferring said electrical signal, said transfer means transferring said signal in two modes including: (1) a first mode in which said electrical signal is transferred in the direction of said storage means during the same time interval as a field time interval of a standard television signal; and (2) a second mode in which charge is transferred from said sensing means into said storage means during the field time interval of a standard television signal and at a different timing from that of said first mode.

22. A device according to claim 21 further comprising:
  change over means for changing over between said first mode and said second mode; and
  read out means for reading out the signal stored in said storage means.

23. A drive device for a system which comprises radiation-signal conversion elements arranged in a matrix and storage elements arranged in a matrix for storing signals by converting operation of said conversion elements, said drive device comprising:
  (a) first means for driving said radiation-signal conversion elements and transferring said signal in the direction of said storage elements;
  (b) second means for driving said storage elements and transferring said signal in the same direction as that of said first means; and
  (c) control means for driving said first and second means, wherein both said first and second means are operated for every field time interval of a standard television signal and said first means is operated in a time interval between the operation of both first and second means.

24. A drive device according to claim 23, wherein said first means drives said radiation-signal elements to transfer signals generated by said radiation-signal elements in the direction of said storage means one line by one.

25. A drive device according to claim 24, wherein said second means drives said storage elements to transfer said signal stored in said storage elements in the same direction as that of said first means one line by one.

26. A drive device according to claim 25, wherein said control means drives both said first and second means for transferring signals one line by one at least a number of times that is the same as the number of said radiation-signal conversion elements when both said first and second means are operated for every time interval of a standard television signal.

27. A drive device according to claim 26, wherein said control means drives said first means transferring signals one line by one at least a number of times that is the same as the number of columns of said signal conversion elements when said first means are operated.

28. A drive device according to claim 23, wherein said control means includes:
  (a) means for generating a first signal at every field time interval of a standard television signal;
  (b) means for generating a second signal at the time interval of said field time interval;
  (c) means for driving said first and second means in response to said first signal; and
  (d) means for driving said first means in response to said second signal.

29. A drive device according to claim 28, wherein the timing when said second signal is generated in said second signal generating means is manually adjustable.

30. A drive device according to claim 28, wherein the timing when said second signal is generated in said second signal generating means is controlled in accordance with intensity of incident radiation on said radiation-signal conversion elements.

31. A device comprising:
  (a) radiation-signal conversion elements arranged in a matrix, each of said elements converting radiation incident thereon into a signal and transferring the signal;
  (b) storage element arranged in a matrix for storing a signal generated by the conversion operation of said radiation-signal conversion element, each of said storage elements also transferring a signal;
  (c) first means for driving said radiation-signal conversion elements and transferring said signal in the direction of said storage elements;
  (d) second means for driving said storage elements and transferring said signal in the same direction as that of said first means; and
  (e) control means for driving said first and second means, wherein both said first and second means are operated for every field time interval of a standard television signal and said first means is operated at a time interval between the operation of both said first and second means.

32. A device according to claim 31, wherein said first means drives said radiation-signal elements to transfer said signal generated by said radiation-signal elements in the direction of said storage means one line by one.

33. A device according to claim 32, wherein said second means drives both said storage elements to transfer said signal stored in said storage elements in the same direction as that of said first means row by row.

34. A device according to claim 33, wherein said control means drives both said first and second means for transferring said signal one line by one at least a number of times that is the same as the number of columns of said radiation-signal conversion elements when both said first and second means are operated for every time interval of a standard television signal.

35. A device according to claim 34, wherein said control means drives said first means for transferring said signal one line by one at least a number of times that is the same as the number of columns of said radiation-signal conversion elements when said first means are operated.

36. A device according to claim 31, wherein said control means includes:
  (a) means for generating a first signal at every field time interval of a standard television signal;
  (b) means for generating a second signal at a time interval of said field interval;
  (c) means for driving said first and second means in response to said first signal,
  (d) means for driving said first means in response to said second signal.

37. A device according to claim 36, wherein a timing when said second signal is generated in said second signal generating means is manually adjustable.

38. A device according to claim 36, wherein a timing when said second signal is generated in said second signal generating means is controlled in accordance with the intensity of incident radiation on said radiation-signal conversion elements.

39. A device according to claim 31 further comprising:
  overflow preventing means disposed in said radiation-signal conversion elements arranged in a matrix for preventing generation of a signal from said radiation-conversion elements through overflow when said first means is operated by said control means.

40. A method according to claim 1, further comprising the step of preventing said image sensing part from overflowing.

41. A method according to claim 40, wherein said overflow preventing step is performed by means provided in image sensing part.

42. A method according to claim 41, wherein said overflow preventing means is an overflow drain.

43. A device comprising:
sensing means having a matrix of sensing elements, said sensing means converting radiation into an electrical signal;
storage means for storing a signal, said storage means being disposed adjacent said sensing means, and transfer means for transferring said electrical signal, said transfer means transferring said signal in two modes including: (1) a first mode in which said electrical signal is transferred in the direction of said storage means during a portion of a predetermined time interval; and (2) a second mode in which charge is transferred from said sensing means into said storage means during a portion of the field time interval of a standard television signal and at a different timing from that of said first mode.

44. A device according to claim 43 further comprising:
change over means for changing over between said first mode and said second mode; and
read out means for reading out the signal stored in said storage means.

45. A device according to claim 43, wherein said predetermined time interval is constant interval.

46. A device comprising:
sensing means having a matrix of sensing elements, said sensing means converting radiation into an electrical signal;
storage means for storing a signal, said storage means being disposed adjacent said sensing means, and transfer means for transferring said electrical signal, said transfer means transferring said signal in two modes including: (1) a first mode in which said electrical signal is transferred during a portion of the same interval as a field time interval of a standard television signal; and (2) a second mode in which charge is transferred from said sensing means into said storage means during a portion of the field time interval of a standard television signal and at a different timing from that of said first mode.

47. A device according to claim 46 further comprising:
change over means for changing over between said first mode and said second mode; and
read out means for reading out the signal stored in said storage means.

48. A device according to claim 46, wherein said first mode is a mode in which an electrical signal is transferred to be erased.

49. A device comprising:
sensing means having a matrix of sensing elements, said sensing means converting radiation into an electrical signal;
storage means for storing a signal, said storage means being disposed adjacent said sensing means;
transfer means for transferring said electrical signal, said transfer means transferring said signal in two modes including: (1) a first mode in which said electrical signal is transferred in the direction of said storage means during a portion of a predetermined time interval; and (2) a second mode in which charge is transferred from said sensing means into said storage means during a portion of the field time interval of a standard television signal and at a different timing from that of said first mode; and
control means for controlling said second mode of said transfer means according to a switching operation of the standard television signal.

50. A device according to claim 49 further comprising:
change over means for changing over between said first mode and said second mode; and
read out means for reading out the signal stored in said storage means.

51. A device according to claim 49, wherein said predetermined time interval is constant interval.

52. A device comprising:
sensing means having a matrix of sensing elements, said sensing means converting radiation into an electrical signal;
storage means for storing a signal, said storage means being disposed adjacent said sensing means;
transfer means for transferring said electrical signal, said transfer means transferring said signal in two modes including: (1) a first mode in which said electrical signal is transferred during a portion of the same interval as a field time interval of a standard television signal; and (2) a second mode in which charge is transferred from said sensing means into said storage means during a portion of the field time interval of a standard television signal and at a different timing from that of said first mode; and
control means for controlling said second mode of said transfer means according to a switching operation of standard television signal.

53. A device according to claim 52, further comprising:
change over means for changing over between said first mode and said second mode; and
read out means for reading out the signal stored in said storage means.

54. A device according to claim 52, wherein said first mode is a mode in which an electrical signal is transferred to be erased.

55. A driving method according to claim 7, wherein said third step is performed at a later timing during said first period as said object is brighter.

* * * * *

UNITED STATES PATENT AND TRADEMARK OFFICE
CERTIFICATE OF CORRECTION

PATENT NO. : 4,803,555
DATED : February 7, 1989
INVENTOR(S) : Shinbori, et al.

It is certified that error appears in the above-identified patent and that said Letters Patent is hereby corrected as shown below:

Title page:

[57] ABSTRACT

Line 1, change "solid-stage" to --solid-state--.

COLUMN 6

Line 17, change "sensing part" to --sensing part 2--.

COLUMN 11

Line 30, change "part" to --part,--; and
Line 31, change "first time interval" to --said first time interval--.

COLUMN 12

Line 45, change "wherein anti-" to --wherein said anti---;
Line 46, after "is" insert --an--;
Line 47, change "wherein anti-" to --wherein said anti---; and
Line 48, after "is" insert --an--.

UNITED STATES PATENT AND TRADEMARK OFFICE
CERTIFICATE OF CORRECTION

PATENT NO. : 4,803,555

DATED : February 7, 1989

INVENTOR(S) : Shinbori, et al.

It is certified that error appears in the above-identified patent and that said Letters Patent is hereby corrected as shown below:

COLUMN 14

Line 1, change "(b) storage element" to --(b) storage elements--;
Line 3, change "element" to --elements--; and
Line 46, change "signal," to --signal; and--.

COLUMN 16

Line 47, change "of standard" to --of a standard--.

Signed and Sealed this

Third Day of April, 1990

Attest:

HARRY F. MANBECK, JR.

*Attesting Officer*   *Commissioner of Patents and Trademarks*